Figure 1:
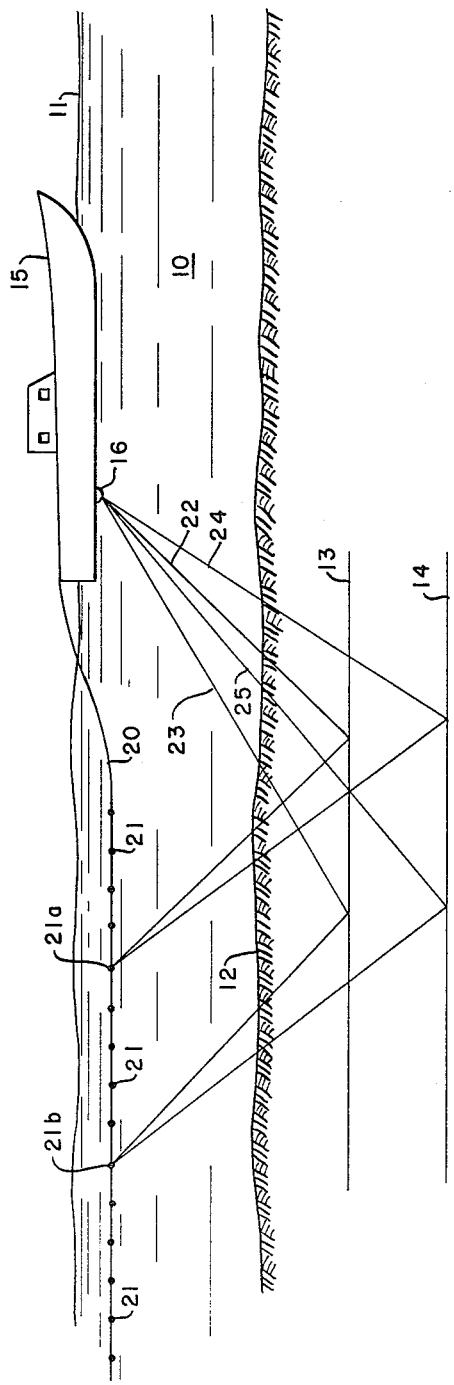

June 15, 1965 W. L. ROEVER 3,189,870
GEOPHONE SPREAD FOR SEISMIC SYSTEMS
Filed Dec. 30, 1960

INVENTOR:
W. L. ROEVER

BY: *Theodore E. Bieber*
HIS ATTORNEY

United States Patent Office 3,189,870
Patented June 15, 1965

3,189,870
GEOPHONE SPREAD FOR SEISMIC SYSTEMS
William L. Roever, Bellaire, Tex., assignor to Shell Oil Company, New York, N.Y., a corporation of Delaware
Filed Dec. 30, 1960, Ser. No. 79,842
2 Claims. (Cl. 340—7)

This invention relates to seismic equipment and more particularly to a detector spread of variable extent for use in a marine seismic exploring system.

In marine seismic exploring systems it is customary to locate a sound source on a vessel and stream behind the vessel a cable having a plurality of detectors disposed thereon. The vessel is then moved slowly over the area to be surveyed as the sound source is energized to emit a series of acoustical impulses. The sensitivity and resolution of a detector spread of the above type is limited by signal-to-noise ratio of the detectors disposed on the cable.

One method that has been used to increase the sensitivity and resolution of a detector spread has been to increase the length of the detector spread thus increasing the number of detector locations and thus the signal to noise ratio. The length to which a detector spread may be increased is limited by the time difference between the receiving of a reflected wave by the nearest and farthest detectors on the spread. In actual practice it is necessary to limit this time difference to a phase difference of one-half cycle. If signals reflected from shallow depths are to be detected, the length of the spread must be maintained relatively short. This of course decreases the signal-to-noise ratio of the detector spread and therefore reduces the ability to resolve signals reflected from deeper horizons. The number of detectors which can profitably be disposed along any given length of cable is determined by the source of the noise to be discriminated against. When the distance of two detector elements from the noise source is nearly equal, these elements could be replaced by one element with no loss in signal to noise ratio. Since the noise sources are presumed to be primarily at or near the water surface, the spacing between detectors which can profitably be used is governed by the depth at which the detector is towed which in turn is determined by other considerations.

Accordingly, a principal object of this invention is to provide a novel detector spread having the ability to resolve signals reflected from shallow horizons and still provide maximum sensitivity to signals reflected from deeper horizons.

The above objects and advantages of this invention are achieved by providing a relatively extensive detector spread divided into a plurality of segments. Each of the individual segments of the spread consists of a supporting cable having a plurality of detectors or hydrophones attached thereto. The hydrophones are spaced along the supporting cable thereby making the detector string sensitive to signals arriving from directions perpendicular to the detector cable but insensitive to signals from other directors. All of the individual segments are connected to form a single spread having over-all dimensions substantially equal to the sum of the individual segments.

In a preferred arrangement, the individual segments are connected end-to-end along a single cable and each of the individual segments of the spread are separately coupled to a control circuit located on the towing vessel. The control circuit includes a switch means for each segment which is actuated by the actuation of the sound source. The switch means are disposed to successively couple the various individual segments to a recording circuit at appropriate times after the actuation of the sound source. When the sound source is actuated only the individual segment disposed nearest to the towing vessel will be coupled to the recording instruments, after an appropriate time delay the next segment will also be coupled to the recording instruments. This sequence will continue until all of the segments have been coupled to the recording instrument. This results in a detector spread having a short over-all length at the time the sound source is fired and then increases in length as the sound is reflected from deeper horizons. Each additional segment is added to the detector spread at an appropriate time interval which is chosen to limit the phase difference between the signals arriving at the hydrophone closest to the towing vessel and at the hydrophone farthest from the vessel to one-half cycle or less.

As is seen from the above description, the detector spread of this invention provides a short detector spread for the first arriving signals and a relatively long detector spread for the later arriving signals. Thus, the weakest signals will be received by a larger number of hydrophones and the over-all signal-to-noise ratio will be materially increased over that which is possible when fixed length detector spreads are used. This increase will be achieved without decreasing the resolution of the system since the hydrophones will be spread for optimum resolution.

Figure 2:
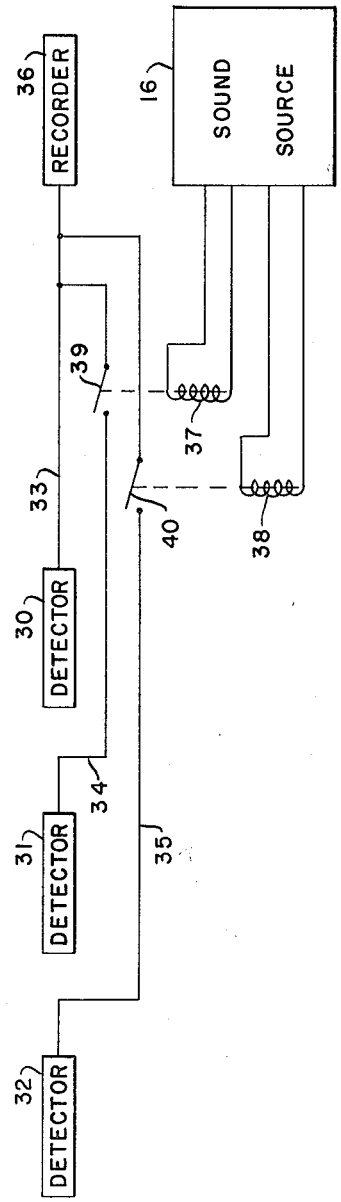

The above invention will be more easily understood from the following description when taken in conjunction with the attached drawing, in which:

FIGURE 1 is a schematic arrangement of a marine seismic exploring system incorporating the detector spread of this invention; and, FIGURE 2 is a block diagram illustrating the means for coupling the various individual segments of the detector spread to a recording circuit.

Referring now to FIGURE 1, there is shown a body of water 10 having a surface 11 and a floor 12. The formation laying below the floor 12 is shown as having two interfaces 13 and 14. The seismic surveying system utilizes a towing vessel 15 which is provided with a sound source 16 and a detector spread 20 which is streamed behind the towing vessel. As is customary in this type of system, the sound source is periodically energized to generate an acoustical wave as the vessel moves slowly over the area to be surveyed. The acoustical wave travels downwardly and is reflected from the various formations underlying the floor 12 in an upward direction. The reflected acoustical waves are received by the various hydrophones positioned along the detector spread 20.

The sound source 16 may be of any known design, for example a hammer striking an anvil or a spark discharge device. The main requirement for the sound source is that it generate periodic acoustical impulses having sufficient amplitude to penetrate the formations underlying the body of water 10. The detector spread 20 normally consists of a supporting cable having sufficient electrical circuits for coupling the hydrophones to a recording instrument located on the towing vessel 15. In addition, the detector spread is normally provided with buoyancy elements to support the hydrophones at a predetermined depth as the vessel moves through the water. A tubular element running the length of the detector spread and filled with oil provides a satisfactory buoyancy element. As shown in FIGURE 1, the individual hydrophones 21 are attached to the supporting cable of the spread and are equally spaced from each other.

In FIGURE 1, the sound source 16 generates a plurality of downwardly traveling acoustical waves which are illustrated by vectors 22, 23, 24 and 25. The vector 22 is reflected from the interface 13 upwardly and it is received by a hydrophone 21a. Similarly, the acoustical wave represented by the vector 23 is reflected from the interface 13 and received by the hydrophone 21b. From an inspection of FIGURE 1 it is easily seen that the acoustical wave represented by the vector 23 must travel a considerably longer path than the acoustical wave represented by the vector 22 and thus the reflected wave arrives at the hydrophone 21a before it arrives at the hydrophone 21b. If this time difference is more than approximately one-half cycle for the mean frequency of the reflected signal, the detected signals will substantially cancel each other and no signal gain will be realized from the use of additional individual segments of detectors. Accordingly, it has been the customary practice to utilize relatively short length detector spreads in order to minimize the time difference between the arrival of the reflected signal at the nearest and farthest hydrophone.

Also in FIGURE 1, the acoustical waves represented by the vectors 24 and 25 are reflected from the deeper buried interface 14 and received by hydrophones 21a and 21b, respectively. In the case of the acoustical waves represented by the vectors 24 and 25, the length of their travel path is substantially equal and thus the difference in the time between their arrival at the hydrophones 21a and 21b is substantially smaller than in the case when acoustical waves were reflected from the shallower interface 13. Accordingly, where the waves are reflected from deeply buried interfaces, it is desirable to use additional hydrophones to add the over-all signal strength. This was impossible with the prior art devices using a relatively short length detector spread since the number of hydrophones were fixed and could not be changed. In contrast, the present invention solves the problem by adding hydrophones to the detector spread as the acoustical waves are reflected from deep interfaces.

Referring now to FIGURE 2, there is shown a block diagram in which 30, 31 and 32 illustrate three individual segments of the detector spread. Each of these separate segments consist of a plurality of individual hydrophones strung along a supporting cable. For example, they may consist of five hydrophones spaced equally along a 20-foot length of cable. Thus, since the three individual segments are coupled together, it results in a detector spread having an over-all length of 60 feet and having 15 individual hydrophones. The individual detector segment represented by the block 30 is coupled to a recorder 36 by means of a circuit 33. Similarly, the detector segments 31 and 32 are coupled to the recorder 36 by circuits 34 and 35. The circuits 34 and 35 are provided with switches 39 and 40, respectively. The switches 39 and 40 are illustrated as being operated by solenoids 37 and 38 which are energized by the firing of the sound source 16. The solenoids 37 and 38 should be of the time delay variety with the time delays selected to close the switches 39 and 40, respectively, to limit the phase difference between the signals detected by the nearest and farthest hydrophones to one-half cycle or less. Accordingly, the switch 39 would close first and then after an additional time delay, the switch 40 would close, thus coupling the individual segments 31 and 32 to the recorder 36.

From the above description, it can be appreciated that there has been provided a detector spread having a short over-all length when the signals are reflected from shallow formations and then increases in length as the signals are reflected from deeper formations. The increase in length of the spread is controlled to limit the phase difference between the signal from the closest and farthest detectors to less than one-half cycle. Accordingly, the signals from the individual detectors will add to the over-all signal strength, thus increasing the signal-to-noise ratio obtainable from the detector spread.

While but one embodiment of this invention has been described in detail many modifications may be made within its broad spirit and scope. For example, other switch means may be substituted for the solenoid actuated switches described above for coupling the additional detector segments to the recording unit. Also, any number of individual segments may be coupled together to form the final detector spread depending on the signal strength and the resolution desired.

Further, the individual segments may be contained in a series of separate cables which may be towed as a two-dimensional horizontal array. By coupling to the recorder first a segment in the center of the array then coupling segments increasing the area of the region containing coupled detectors, the array will be made increasingly directional in its response and increasingly responsive to signals arriving from points along a perpendicular line through the center of the array.

Accordingly, this invention should not be limited to the single embodiment described but only its broad spirit and scope.

I claim as my invention:
1. A marine seismic exploration system comprising:
 (a) a generator of acoustical impulses;
 (b) an elongated composite detector adapted to be towed through water comprising a supporting cable and a plurality of individual seismic transducers having electrical outputs carried by said cable and distributed along the length thereof, groups of longitudinally adjacent transducers having their outputs interconnected to provide at least three individual groups of transducers;
 (c) a recording means having a signal input circuit;
 (d) a circuit for each said group of transducers for separately connecting to said signal input circuit the outputs of the respective groups;
 (e) switch means for opening at least two of said circuits; and
 (f) time-delay means operable in response to the operation of said acoustical impulse generator for closing said switches in succession after the generation of a pulse, said time-delay means being connected to increase progressively the number of transducers connected to said input circuit and the overall length of the connected transducers.

2. An exploration system as defined in claim 1 wherein said individual transducers are spaced at uniform intervals along said cable.

References Cited by the Examiner

UNITED STATES PATENTS

| | | | |
|---|---|---|---|
| 2,088,588 | 8/37 | Dudley | 181—.5 X |
| 2,260,217 | 10/41 | Eckhardt et al. | 181—.5 X |
| 2,798,211 | 7/57 | Smith | 340—7 X |
| 2,897,476 | 7/59 | Widess | 340—15 |
| 2,906,363 | 9/59 | Clay | 181—.5 X |
| 2,923,367 | 2/60 | Cox | 340—15 |

SAMUEL FEINBERG, *Primary Examiner.*

CHESTER L. JUSTUS, NEIL C. READ, *Examiners.*